June 20, 1933. W. C. TROUT 1,914,387
COUNTERBALANCE FOR CRANK SHAFTS
Filed Feb. 10, 1927

Walter C. Trout Inventor

By Jesse R. Stone
Attorney

Patented June 20, 1933

1,914,387

UNITED STATES PATENT OFFICE

WALTER C. TROUT, OF LUFKIN, TEXAS

COUNTERBALANCE FOR CRANK SHAFTS

Application filed February 10, 1927. Serial No. 167,145.

My invention relates to an improvement in counterbalance weights to be employed in connection with crank shafts employed in reciprocating a load, as in pumping operations. The device is particularly adapted for use in deep well pumping and is shown as applied to the standard pumping rig.

An object of the invention is to provide a weight and a crank arm upon the shaft to receive the weight, said weight being adjustable for attachment to the crank arm in position to counterbalance the weight of the pump rods or to be shifted into a position adjacent the shaft, where it will balance the weight of the crank arm.

It is desired that the weight be capable of adjustment without material difficulty and in a minimum amount of time.

Figure 1:
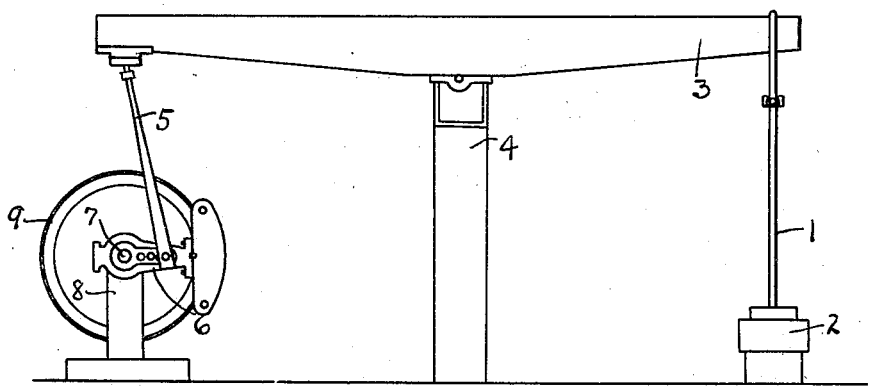
Figure 2:
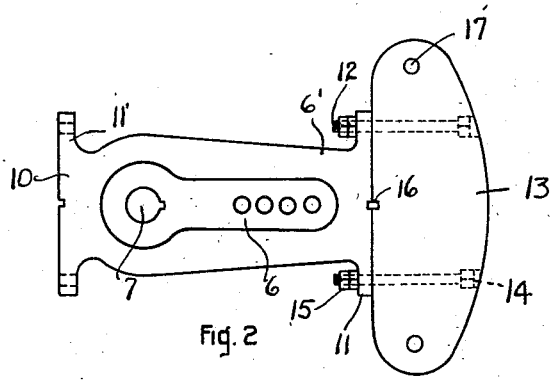
Figure 3:
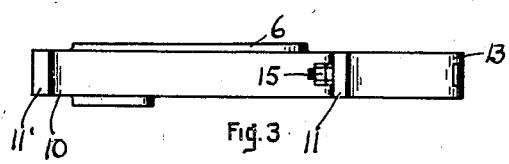

Referring to the drawing herewith, Fig. 1 is a somewhat diagrammatic view of a standard pumping rig showing my crank balance weight applied to the crank arm thereof. Fig. 2 is a side elevation of the crank arm with my weight thereon, said view being somewhat enlarged. Fig. 3 is a top plan view of the arm and weight disclosed in Fig. 2.

While I have shown the device as applied to a standard rig, it is to be understood that its use is not necessarily confined to this particular type of equipment, as it may be employed in connection with pumping jacks or other devices whereby a load is raised and lowered in the operation thereof. Fig. 1 illustrates the pump rod 1 as being reciprocated within a well casing indicated at 2, the rod being connected with a walking beam 3 supported for rocking movement upon a Samson post 4. Said walking beam is operated through the connection by means of a pitman 5 with a crank arm 6 mounted upon the crank shaft 7, supported for rotation upon jack post 8. The band wheel 9 upon the crank shaft allows the connection therewith of power whereby the shaft may be rotated.

The crank arm in my construction is shown best in Figs. 2 and 3. Said arm is somewhat enlarged from its ordinary shape being in the form of a plate and is extended on opposite sides of the shaft to form a power arm 6' and an auxiliary arm 10, said arm 10 being materially shorter than the arm 6' and adapted to receive and support the weight.

The outer end of the arm 6' has forwardly and rearwardly extending lugs 11 thereon, said lugs being provided with openings therein to receive bolts 12. The end of the arm is formed in a plane so as to provide attachment thereto of a weight 13.

The weight 13 may be of any desired shape or size. I have shown the outer edge thereof as being curved on the arc of a circle having the shaft 7 for a center. The ends of the weight are rounded off and the inner side is made plane to fit against the outer face of the arm 6', as shown in Fig. 2. The weight is provided with transverse openings 14 to allow the insertion of bolts 12 extending through the weight and through the openings in the flanges 11 of the arm so as to secure the weight to the crank arm. Nuts 15 upon said bolts permit the weight to be clamped rigidly to the outer end of the crank arm. I have shown keyways formed in the weight and in the end of the arm to receive a key 16 therein, said key resisting any movement of the weight laterally relative to the arm in an obvious manner.

The auxiliary arm 10 is formed with laterally extending lugs 11' thereon, said lugs being provided with openings to receive the bolts 12 so that the weight may be moved to a position on the end of the auxiliary arm 10 and be secured thereto in the same manner as has been described relative to the outer end of the arm 6'.

In the use of my counterbalance, the weight will be secured at the outer end of the crank arm during pumping operations and will tend to assist the crank in raising the load of the pump rods and the plunger and to resist the dropping of the same on the downward stroke of the plunger. Thus, in Figure 1, the crank arm may be understood as rotating in a clockwise direction to raise the load of the pump rod 1, and it will be seen that the weight will tend to counterbalance the weight of the rods.

On the upward movement of the weight and crank arm the pump rods will be dropping and the weight will tend to resist the sudden downward movement of the rods and plunger.

When it is desired to remove the connection between the crank arm and the pitman 5 so as to use the band wheel for the transmission of power to a hoisting apparatus or other similar device, the weight 13 may be disconnected from the crank arm 6' and moved to balancing position on the arm 10, and quickly secured in place thereon. The weight 13 will then tend to balance the weight of the crank arm 6' and the rotation of the shaft 7 will be balanced so that there will be no strain upon the working parts of the apparatus. Openings 17 may be made in the weight at each end thereof to provide means to attach thereto a hook or chain whereby the weight may be lifted and moved from one position to the other relative to the crank shaft without difficulty.

The advantages of the construction will be apparent to those skilled in the art without further description.

What I claim as new and desire to protect by Letters Patent is:

1. In a device of the character described, a crank shaft, a crank arm thereon extending radially from said shaft, an oppositely extending auxiliary arm, the ends of said arms having laterally extending lugs thereon, and a weight adapted to fit against the said lugs and be secured thereto on either arm, for the purpose described.

2. In a device of the character described, a crank shaft, a plate secured to said shaft at one end, one end of said plate forming a crank arm, laterally extending lugs at each end of said plate, a weight, and means to rigidly secure said weight to said lugs at either end of said plate, said weight being bodily removable from one end of said plate for attachment to the other end thereof, for the purpose described.

3. A crank shaft, a crank arm extending radially therefrom, an auxiliary arm projecting in an opposite direction from said shaft, the ends of said arms being flattened, lateral lugs on said ends, a weight shaped to fit said flattened ends, and means to secure said weight to said lugs.

In testimony whereof I hereunto affix my signature this 5th day of February, A. D. 1927.

WALTER C. TROUT.